United States Patent
Dropps

(10) Patent No.: US 9,154,569 B1
(45) Date of Patent: Oct. 6, 2015

(54) METHOD AND SYSTEM FOR BUFFER MANAGEMENT

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 246 days.

(21) Appl. No.: 13/969,084

(22) Filed: Aug. 16, 2013

(51) Int. Cl.
  G06F 15/16 (2006.01)
  H04L 29/08 (2006.01)
  H04L 12/801 (2013.01)
  H04W 28/10 (2009.01)
  H04L 12/825 (2013.01)

(52) U.S. Cl.
  CPC .............. H04L 67/28 (2013.01); H04L 47/10 (2013.01); H04L 47/11 (2013.01); H04L 47/266 (2013.01); H04W 28/10 (2013.01)

(58) Field of Classification Search
  CPC ....... H04L 47/10; H04L 47/266; H04L 47/11; H04L 67/28; H04W 28/10
  USPC .................. 709/232–236; 370/230, 232, 235
  See application file for complete search history.

(56) References Cited

U.S. PATENT DOCUMENTS

| | | | |
|---|---|---|---|
| 6,405,258 B1 * | 6/2002 | Erimli et al. | 709/235 |
| 6,628,613 B1 * | 9/2003 | Joung et al. | 370/230 |
| 7,002,911 B1 * | 2/2006 | Linville et al. | 370/230 |
| 7,436,773 B2 * | 10/2008 | Cunningham | 370/236 |
| 7,937,748 B2 * | 5/2011 | Inoue et al. | 726/6 |
| 7,961,606 B2 * | 6/2011 | Cunningham | 370/229 |
| 9,055,467 B2 * | 6/2015 | Hernandez et al. | 1/1 |
| 2004/0179476 A1 * | 9/2004 | Kim et al. | 370/230 |
| 2006/0120289 A1 * | 6/2006 | Cunningham | 370/235 |
| 2007/0058600 A1 * | 3/2007 | Chung et al. | 370/338 |
| 2008/0304415 A1 * | 12/2008 | Cunningham | 370/235 |
| 2010/0103816 A1 * | 4/2010 | Eiro | 370/230 |

* cited by examiner

*Primary Examiner* — Moustafa M Meky
(74) *Attorney, Agent, or Firm* — Klein, O'Neill & Singh, LLP

(57) ABSTRACT

Method and system for a first network device communicating with a second network device are provided. A first duration is compared with a stored maximum pause delay value and the first duration is set as a new maximum pause delay value when the first duration is greater than the maximum pause delay value. The new maximum pause delay value is compared with a programmed pause delay threshold value that indicates a duration after which the first network device will stop sending frames, after the pause frame is received by the first network device. A pause threshold value and the programmed pause delay threshold value are adjusted based on the comparison between the new maximum pause delay value and the programmed pause delay threshold value.

21 Claims, 7 Drawing Sheets

METHOD AND SYSTEM FOR BUFFER MANAGEMENT

BACKGROUND

1. Technical Field

The embodiments disclosed herein are related to networks and network devices.

2. Related Art

Networking systems are commonly used to move network information (which may also be referred to interchangeably, as frames, packets, data or commands) between computing systems (for example, servers) or between computing systems and network devices (for example, storage systems). Various hardware and software components are used to implement network communication. Different network and storage protocols may be used to handle network information and storage information.

Network devices use ports to communicate with via links. The ports today communicate at very high speeds. The ports use memory storage (may be referred to as receive buffers) for receiving and temporarily storing information. Managing receive buffers is desirable to avoid overflowing or underutilization of storage space. Continuous efforts are being made to improve.

BRIEF DESCRIPTION OF THE DRAWINGS

The various present embodiments now will be discussed in detail with an emphasis on highlighting the advantageous features. These embodiments depict the novel and non-obvious systems and methods for network devices shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
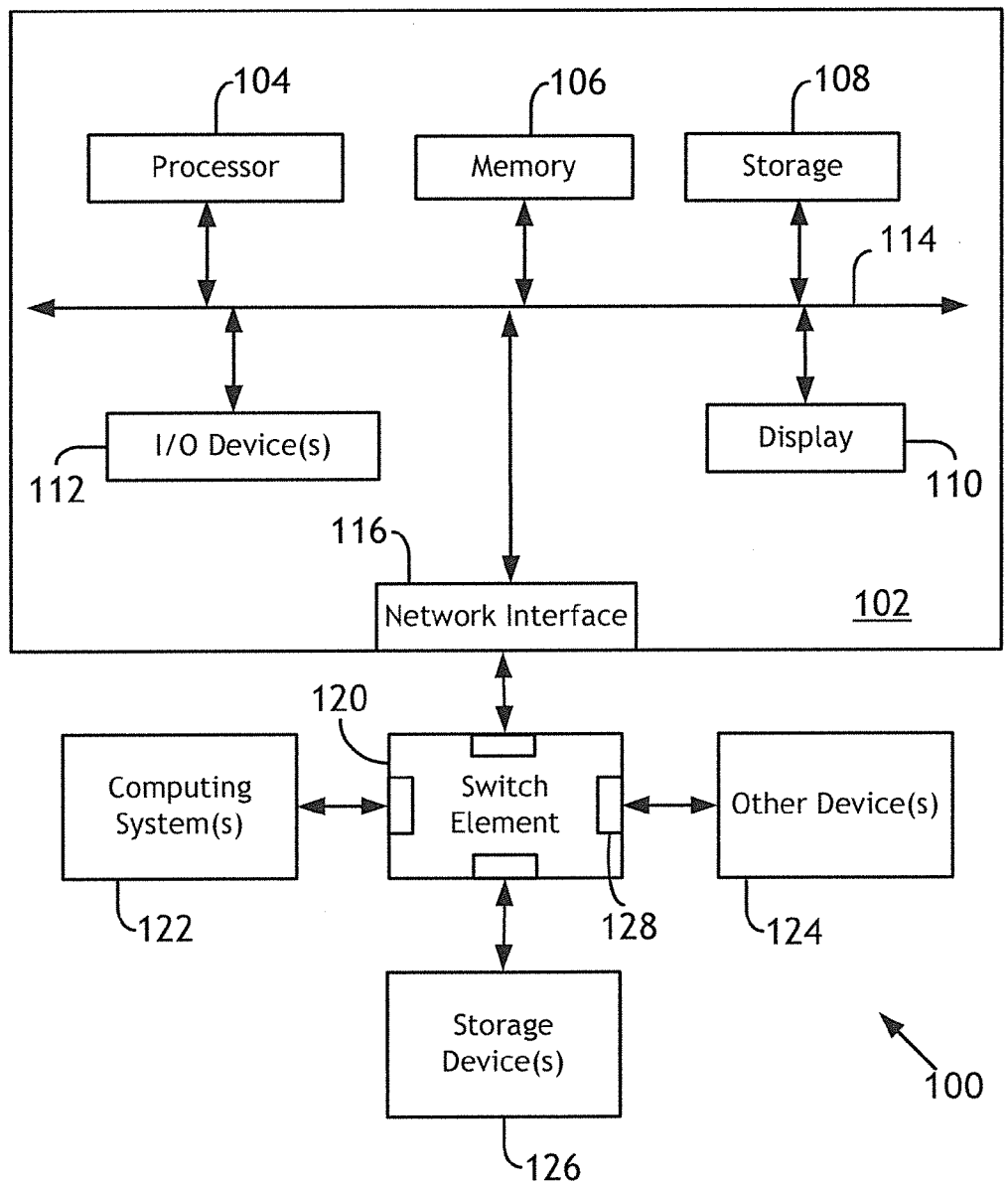

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environments. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse and others. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, a host bus adapter, a network interface card or any other network adapter type.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the network interface 116 for host system 102, the computing systems 122, the storage devices 126, and the other devices 124) may include one or more ports 128 for receiving and transmitting information, for example, node ports (N_Ports), Fabric ports (F_Ports), and expansion ports (E_Ports). Node ports may be located in a node device, e.g. network interface 116 the host system 102 and an interface (not shown) for the storage devices 126. Fabric ports are typically located in Fabric devices, such as a network switch element, for example, switch element 120.

Figure 2A:
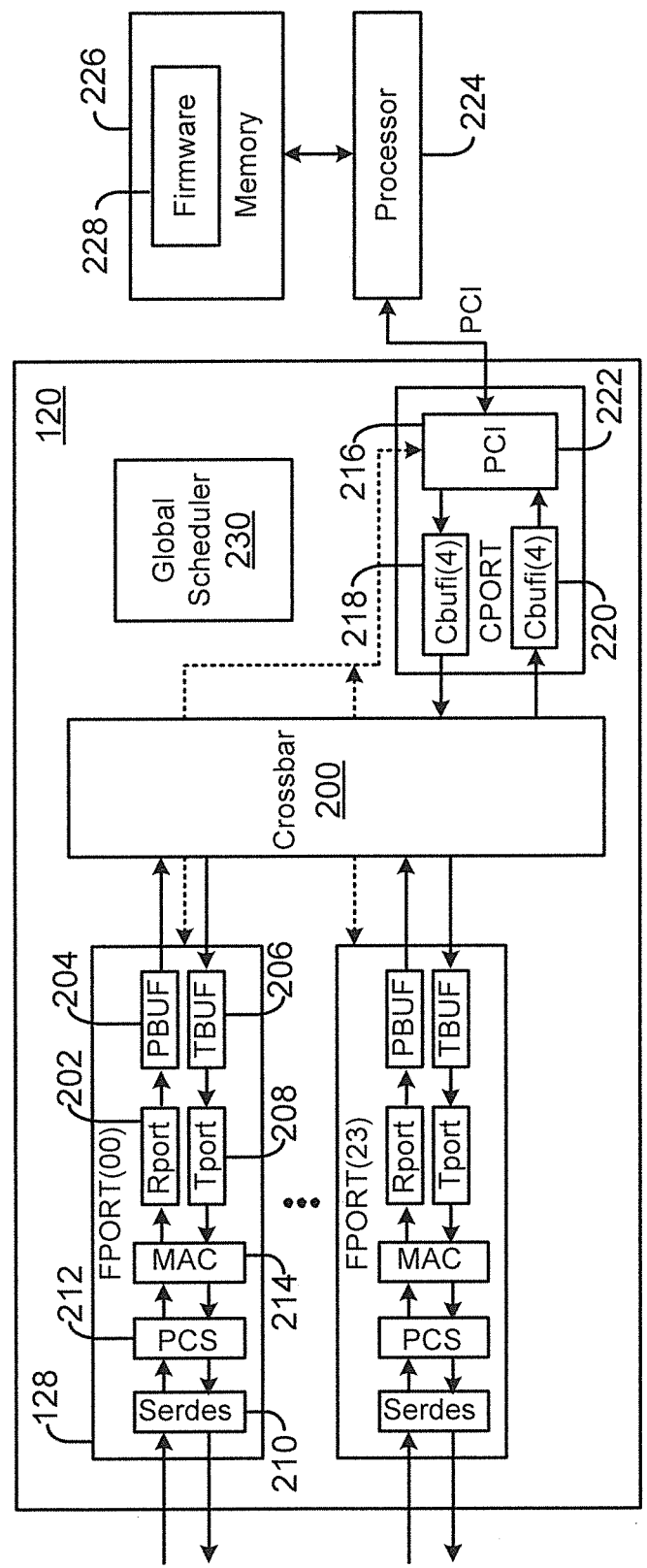
FIG. 2A is a functional block diagram of a switch element according to the present embodiments.

FIG. 2A is a high-level block diagram of switch element 120, also referred to as the switch 120. It is noteworthy that the embodiments disclosed herein are not limited to switch element 120 and may be implemented and practiced in other network device type, for example, adapter, NICs and other device types Switch element 120 may be implemented as an application specific integrated circuit (ASIC) having a plurality of ports 128. A global scheduler 230 schedules frame processing for all ports 128, according to one embodiment.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT (or receive segment) 202 temporarily stores received frames at a memory storage device, shown as PBUF (pause buffer) 204. The frames are then sent to a transmit segment (or transmit port (TPORT) 208 via the crossbar 200. The TPORT 208 includes a memory device shown as a transmit buffer (TBUF) 206. The TBUF 206 may be used to stage frames or information related to frames before they are transmitted. The TPORT 208 may also include a shared MAC and PCS or use the MAC and PCS of RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port 128 to be configured into a plurality of independently, operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
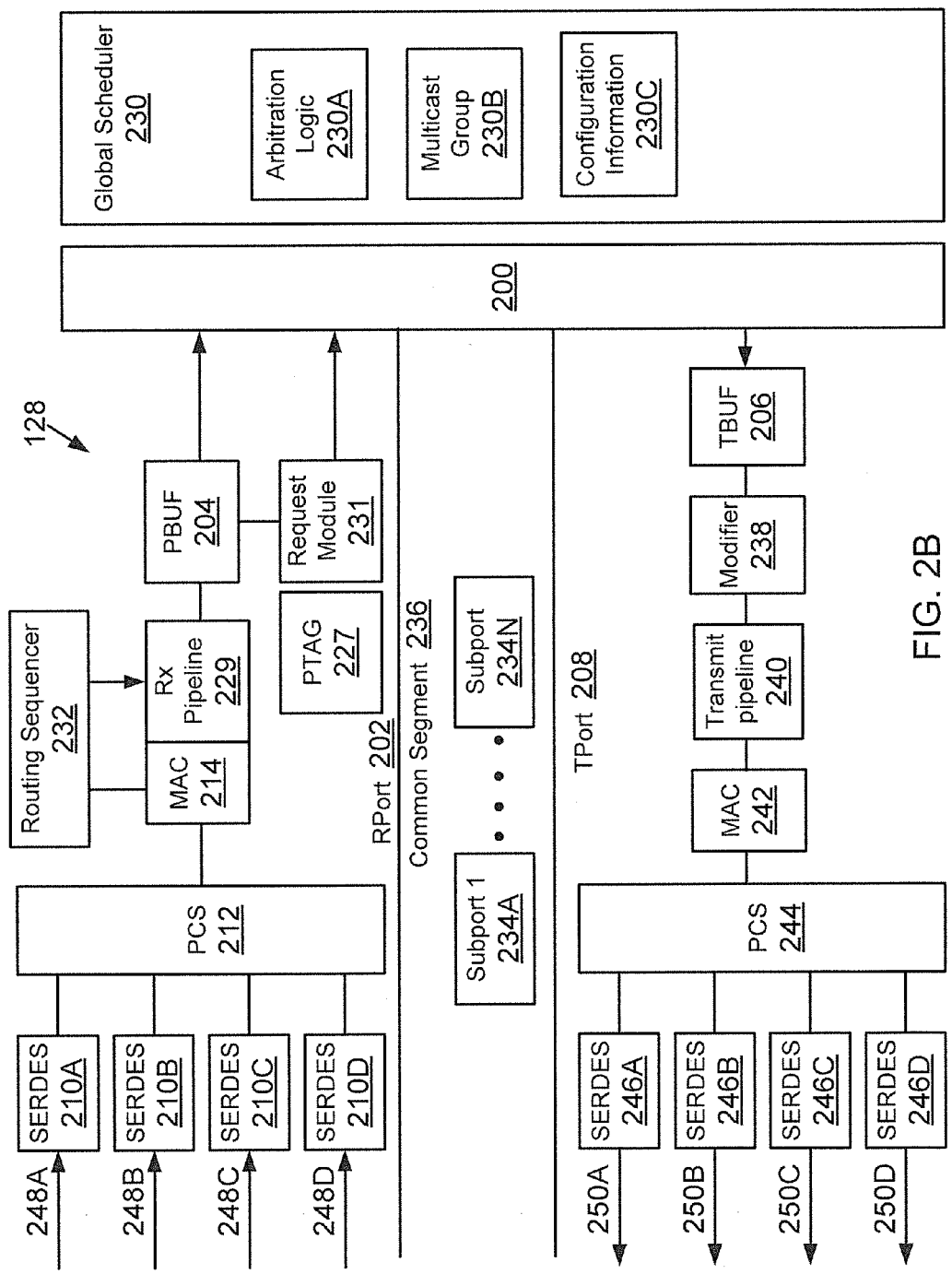
FIG. 2B shows a block diagram of a receive segment, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port 128 may be configured to include a plurality of sub-ports, each identified uniquely, to operate as an independent port. The configuration information/logic 234A-234N for each sub-port may be stored in common segment 236.

RPORT 202 may include or have access to a plurality of network links, for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a port of receive pipeline 229.

Incoming frames are received via one of the network links 248A-248D. The received frame is processed by the appropriate SERDES and then sent to the PCS 212. After PCS 212 processes the frame (for example, performs data decoding), the frame is provided to MAC 214 that is time shared among a plurality of sub-ports. This means that for a certain time segment (for example, clock cycles), a MAC 214 pipeline stage may be used by one of the sub-ports other pipeline stages may be used by different sub_Ports in a given clock cycle. After the MAC 214 processes the frame it is sent to receive pipeline 229 that is also time shared. Information regarding the frame or a copy of the frame is also provided to a routing sequencer 232 that determines the destination of the received packets.

In one embodiment, a frame whose destination is processor 224 is given the highest priority, followed by a frame that is routed by a ternary content addressable memory (TCAM) or steering registers located within a routing sequencer 232. It is noteworthy that more than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

Information regarding the received frames may be stored at another memory device, shown as PTAG 227. The information at PTAG 227 may be referred to as tags that may have various fields. The various fields may include a transmit virtual queue number, a physical transmit queue number, receive buffer location, a destination sub-port number, frame priority, an Ethernet type field, if any, a timestamp, error correction code and others. A tag is initialized when a frame is processed at a PBUF 204 queue. The tag is active as long as the frame is in the PBUF queue. When the receive queue location is empty, the tag is marked invalid. The tags are created and used by a read module and write module (not shown) that manages read/write operations to and from PBUF 204. PTAG 227 may also be used to stage requests for moving frames stored at the PBUF 204 receive queues, before the requests are sent to scheduler 230, as described below.

To move frames from the receive queues; a request module 231 generates requests for the global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and transmit queues and some of that information may be used to select requests. Scheduler 230 includes arbitration logic 230A that performs dual stage arbitration for processing requests from various base-ports. Scheduler 230 also maintains a data structure at a memory labeled as multicast group 230B. The data structure stores information for identifying multicast groups that may receive multicast frames i.e. frames that are destined to multiple destinations. Scheduler 230 uses the information for processing requests that involve multicast frames.

Frames for transmission via TPORT 208 move via TBUF 206 and a modifier 238. In one embodiment, modifier 238 may be used to insert, change or remove information from an outgoing frame. The modification is based on the frame type and transmit virtual queue maintained at TPORT 208. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. In one embodiment, links 248A-248D and 250A-250D are part of the same physical links that are used to receive and transmit information.

Figure 2C:
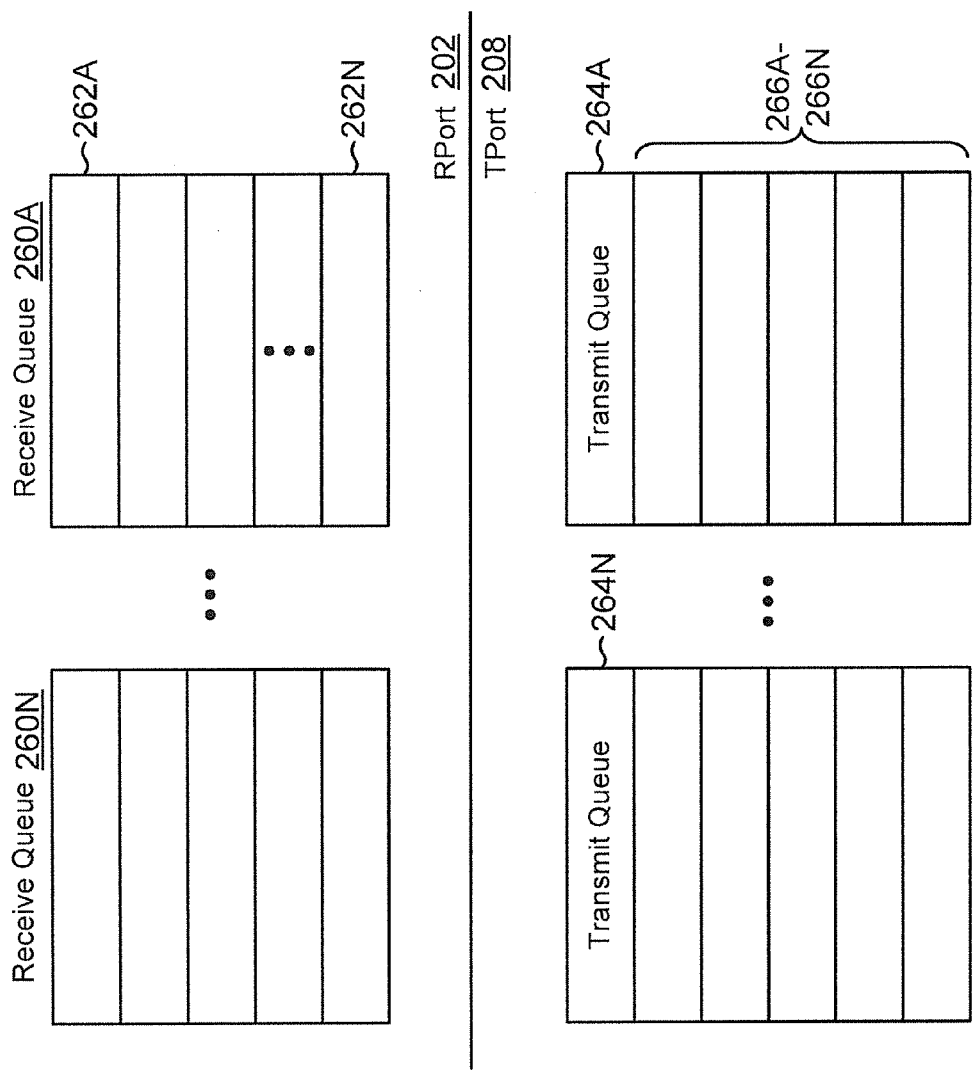
FIG. 2C is a functional block diagram of a plurality of receive queues and a plurality of transmit queues according to the present embodiments.

FIG. 2C shows an example of a plurality of receive queues 260A-260N at RPort 202. Each receive queue may include a plurality of storage locations 262A-262N. The receive queues 262A-262N may be maintained at PBUF 204 and are used to temporarily store incoming frames, while a request to move the frame is presented to scheduler 230. Each queue/location is identified by a queue number or identifier. This information may be included in a tag that is stored at PTAG 227 and sent to scheduler 230.

The transmit side may also have a plurality of transmit queues 264A-264N with storage locations 266A-266N. Each transmit queue is identified by a unique Tx Queue Number. The transmit queues are used to information regarding frames and to manage transmit credit at TPort 208. A transmit queue may be associated with a given class of service, virtual lane, virtual channel, frame priority or other ways of link segregation. When a frame is received, the routing scheduler may assign a transmit queue to the frame. The transmit queue information is then inserted in a tag that is generated by the routing scheduler 232 and stored at PTAG 227.

Figure 3:
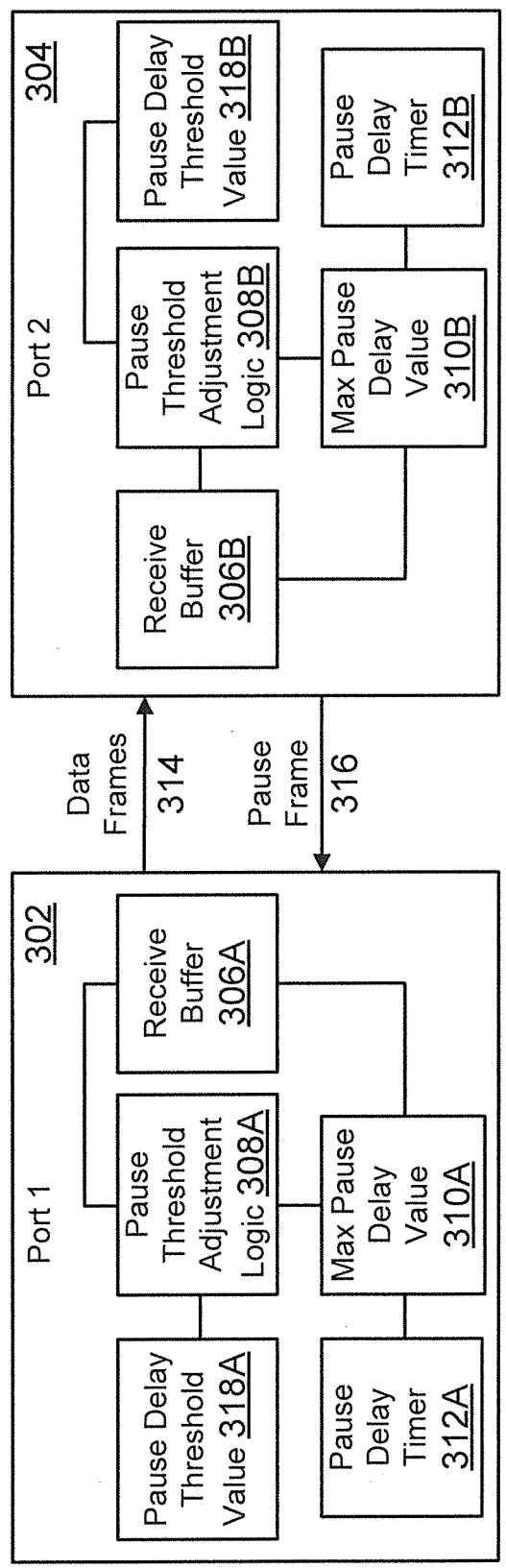
FIG. 3 shows a block diagram of two ports communicating with pause threshold adjustment timers, according to one embodiment.

FIG. 3 shows a system 300 where ports 302 and 304 (similar to port 128) communicate with each other. The ports may be located at switch element 120 or any other network device (for example, NIC 116). In this example, port 302 sends data frames 314 to port 304. The data frames are stored at receive buffer. When port 304 sends data frames to port 302, they are stored at receive buffer 306A. The receive buffers 306A/306B are similar to PBUF 204 306B with queues 260A-260N, described above in detail.

Port 304 sends a pause frame 316 to port 302 to indicate that port 302 needs to stop sending data frames. The pause frame is sent based on a pause threshold value that is set for receive buffer 306B. The pause threshold value may be set during port configuration or otherwise. The pause threshold value indicates how much of a receive buffer needs to be full (i.e. pause condition) so that a transmitting port (for example, 302) can be notified to "pause" sending frames to the receiving port (for example, 304).

In conventional networks, for example, using Ethernet links, different pause threshold values are set based on link operating rates. The factors for setting the pause threshold value may depend on a length of a link between link partners or nodes. If the ports are further apart, a lower threshold value may be used to account for any delay for packets that may in transit, when a pause condition is detected. Another factor for setting a pause threshold may be a maximum transmission unit (MTU) size that is use by the ports to send information.

Conventional receive buffers face various challenges. For example, different network links (for example, Ethernet links) may have different priorities and different MTU sizes. When a receive buffer is servicing multiple ports (or sub-ports) conditions on some links may need larger receive buffer queues than other links. The large queue requirements may be because of distance and/or link operating rates. The long distance and a faster link rate may need larger receive buffer queues for obtaining better performance in using the bandwidth with low latency.

Conventional systems attempt to solve this challenge by providing a device with a very large buffer. However, this solution is not optimal because often the "very" large buffer is underutilized. This also results in inefficient use of real estate on a chip. In one embodiment, as described below in detail, a programmable flexible receive buffer size is provided which provides better usage of receive buffer queues than conventional systems.

Conventional techniques estimate the receive buffer pause threshold value, which is decreased if a buffer overflows. The embodiments described herein monitor traffic and provide feedback for adjusting the pause threshold value for a receive buffer. The feedback is then used to adjust the pause threshold value, instead of waiting for a receive buffer to overflow.

In one embodiment, the system and process disclosed herein measures a duration during which one or more non-control packet (i.e. data packet) is received after a pause frame has been sent. The measured duration can be considered as a maximum value (referred to as "maximum pause delay value) when measured multiple times under different link conditions that naturally occur. The maximum pause delay value may be updated periodically to a larger measured value, as described below in detail. A receive buffer pause threshold value may be adjusted based on this maximum pause delay value. By examining the maximum pause delay value, one is able to set the receive buffer pause threshold value to a higher value which means that more buffer capacity can be used without an actual overflow condition occurring and also allowing for minimizing of unused receive buffer space. In another instance, the pause threshold value may be decreased such that a pause frame can be sent earlier.

Referring back to FIG. 3, in one embodiment, ports 302 and 304 include a maximum pause delay value 310A and 310B that can be used to adjust the receive buffer pause threshold value (not shown) when the maximum pause delay value is greater than the pause delay threshold value 318A and 318B, respectively. The pause delay threshold value 318A and 318B define a duration after which a transmitting port (for example, 302) will stop sending frames, after a pause frame has been sent by the receiving port (for example, 304). The ports also include pause delay timers 312A and 312B, as well as pause threshold adjustment logic 308A and 308B whose function is to modify the receive buffer pause threshold value and the programmed pause delay threshold values, as described below in detail with respect to FIG. 4.

Figure 4:
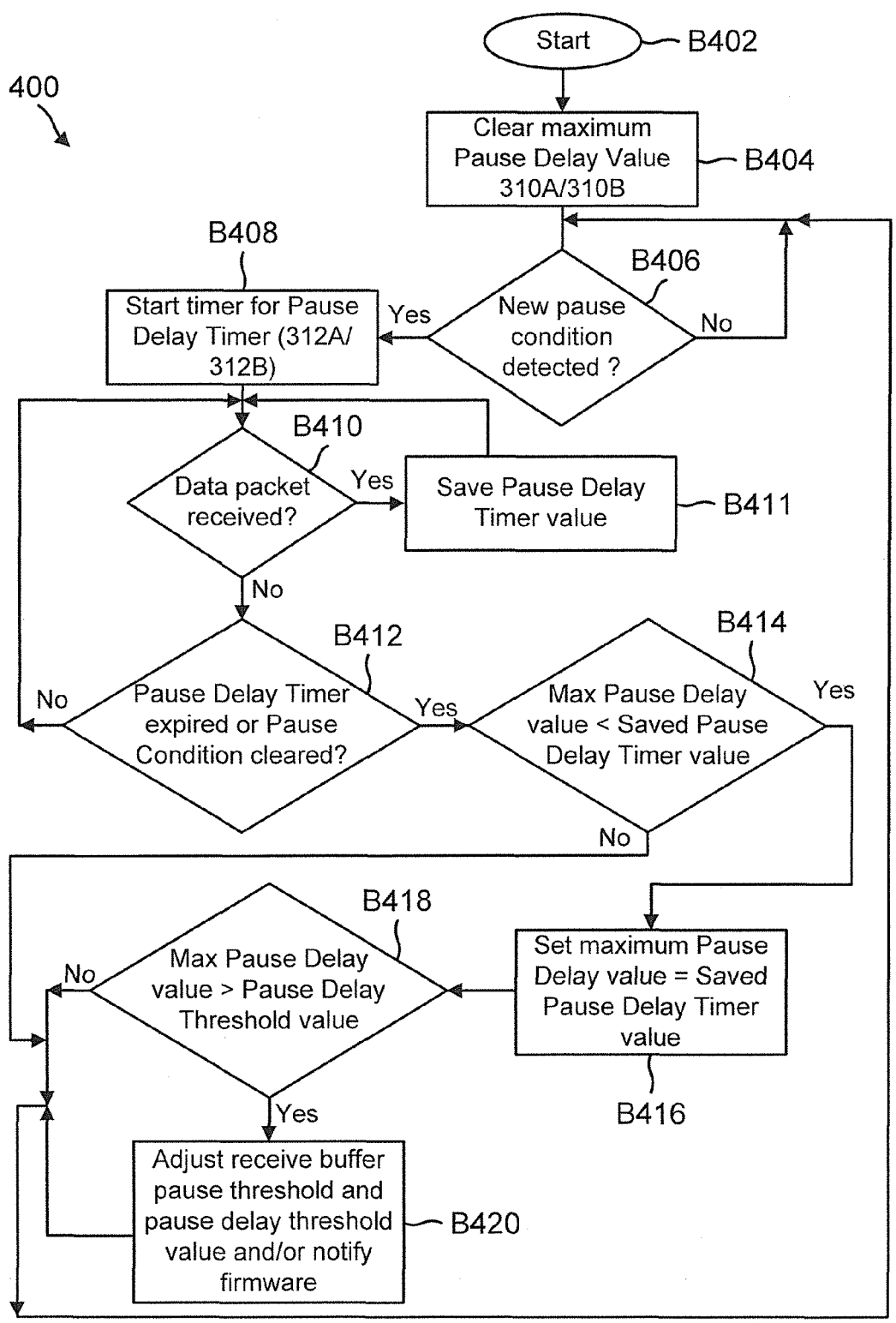
FIG. 4 shows a process flow diagram for adjusting pause threshold, according to one embodiment.

FIG. 4 shows a process 400 for adjusting a pause threshold value based on when a pause frame is sent to a transmitting port, according to one embodiment. The process begins in block B402, when a link between ports, for example, 302 and 304 (FIG. 3) are reset or re-initialized.

In block B404, the maximum pause delay value 310B is cleared by pause threshold adjustment logic 308B. The maximum pause delay value 310B may be stored at a storage location, for example, a register, non-volatile memory and other similar devices. The maximum pause delay value 310B provides a previous duration based on which port 302 will stop sending a data frame, after receiving a pause frame or an initial estimate that may be set by firmware when the port was first initialized.

In block B406, port 304 determines if a new pause condition has been detected i.e. the receive buffer 306B utilization has reached the pause threshold and a pause frame needs to be sent. If not, then the process loops back and waits.

When a new pause condition is detected, the pause delay timer 312B is started in block B408. The pause delay timer 312B is a programmable timer that is set to expire after a longest possible pause delay time. The pause delay timer 312B is intended to track the duration (or measure the duration) of receiving a last data frame after the pause frame 316 is sent.

In block B410, port 304 determines if the last data frame has been received from port 302. If a data frame has been received, the process saves a copy of the current pause delay timer 312B value in block B411 and then the process goes back to block B410. The pause delay timer value 312B may be stored at a storage location; a memory, a register or any other entity that is accessible to the pause threshold adjustment logic 308B.

If a data frame has not been received, then in block B412 the pause delay timer 312B is checked to see if it has expired by reaching the programmed maximum value or if the receive buffer pause condition has cleared. The receive buffer pause condition can clear because some of the data packet(s) are read out of the receive buffer reducing the amount of used buffer space.

If the pause delay timer 312B has not expired and the pause condition still exists, then the process loops back to B410. If the pause delay timer 312B has expired or the pause condition has cleared, then in block B414, the maximum pause delay timer value 310B is compared to the saved pause delay timer value of block B411. If the maximum pause delay value 310B is less than the saved pause delay timer value in B411, then in block B416, the maximum pause delay value 310B is updated based on the saved pause delay timer value from B411.

In block B418, port 304 determines if the updated maximum pause delay value 310B from block B416 has reached the pause delay threshold value 318B. The pause delay threshold value corresponds to the receive buffer pause threshold value. For example, if the pause delay threshold value were 1 microsecond then the receive buffer pause threshold should be set at a value that would allow enough unused or open receive buffer storage for at least 1 microsecond worth of link data frames without overflowing the buffer. The pause delay threshold value is initially an estimate of the maximum pause delay value and is updated in B420, as described below, to correspond with the receive buffer pause threshold.

If the maximum pause delay value has not reached the pause delay threshold value, then the process moves to block B404. Otherwise, in block B420, the receive buffer pause threshold and the pause delay threshold value 318B are adjusted. In one embodiment, the receive buffer pause threshold is measured in units of receive buffer data packet storage capacity like bytes, words, blocks or frames. The pause delay threshold value may be measured in units of time. There is a direct correlation between the two thresholds since they both depend on the link data rate. Higher data rate links use a lower receive buffer pause threshold for a given receive buffer size. In another embodiment, port 304 notifies the network device firmware (228, FIG. 2A) of the network device regarding the adjustment and/or the maximum pause delay value being greater than the pause delay threshold value such that the firmware can make the decision to adjust the pause threshold value and the pause delay threshold value.

In one embodiment, systems and methods are provided to adjust receive buffer threshold values, without having to or allowing overflow of the receive buffer thereby disrupting the flow of data packets or to have the receive buffer underutilized thereby reducing link bandwidth performance.

In one embodiment, there are multiple copies of the receive buffer pause threshold values 318A and 318B, maximum pause delay value 310 A and 310B, pause delay timer 312a and 312B and the pause threshold adjustment logic 308A and 308B; one for each receive buffer queue. It is noteworthy, that the pause threshold adjustment logic 308A and 308B may be shared for multiple receive buffer queues.

In yet another embodiment, a configurable method and system for establishing receive buffer queue size is provided. The device may start with an initial queue size, however, a user is provided an option via a user interface (not shown) allowing the user to establish different queue sizes based on operating rates, link lengths and other factors. The queue sizes may be adjusted dynamically by establishing starting and ending addresses for each queue. The configuration addresses may be stored at common segment 236.

Figure 5:
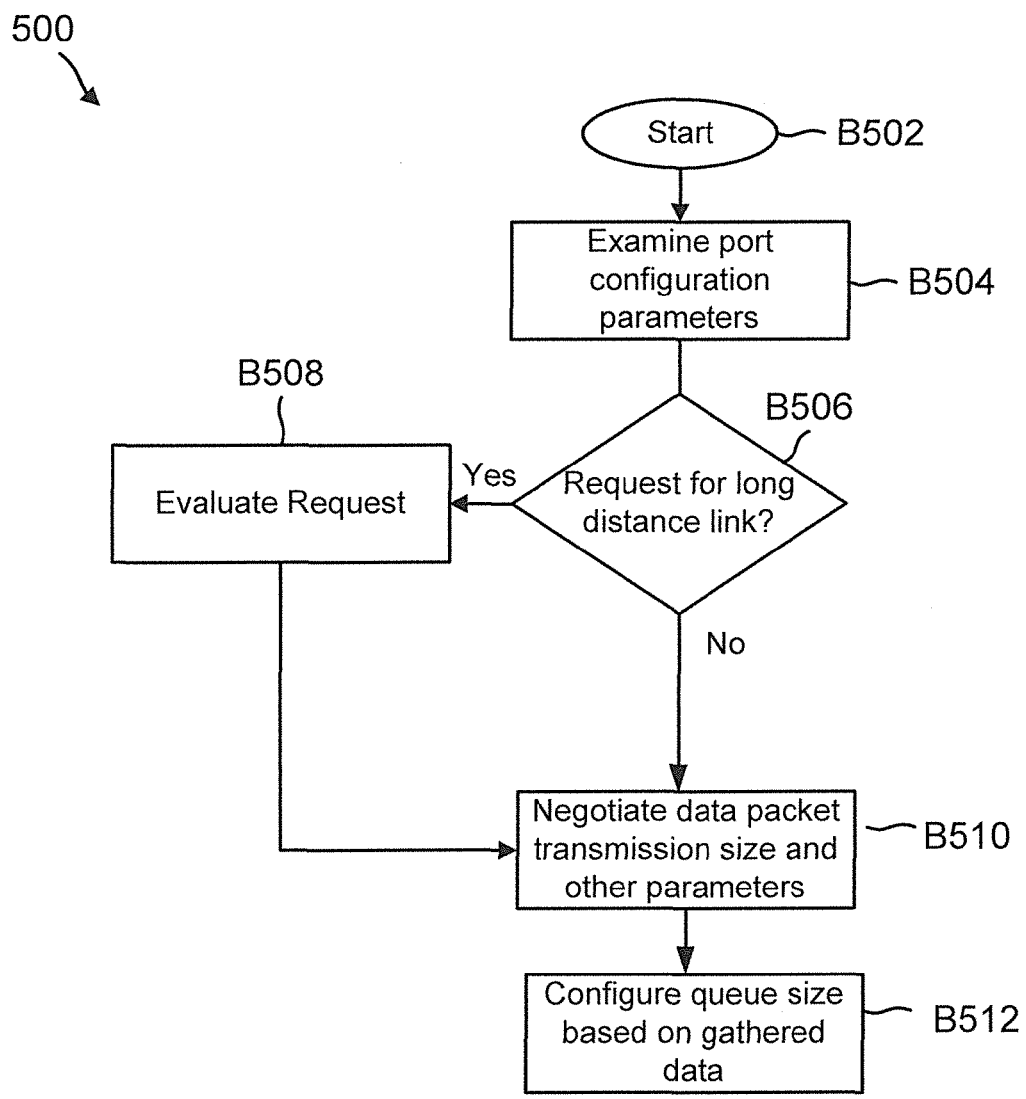
FIG. 5 shows a process for configuring receive buffer queues, according to one embodiment.

FIG. 5 shows a process 500 for configuring receive buffer queues, according to one embodiment. The process begins in block B502, when ports 302 and 304 are communicating and operational. The process may also begin during a configuration phase, when ports 302 and 304 are being configured by a user using a management application at a computing device, for example, 102 or 122. The management application (not shown is a processor executable application that provides a command line interface (CLI), a graphical user interface (GUI) or both.

In block B506, the port configuration parameters are examined. This includes examining number of links, operating rates, protocols used for communication (for example, Ethernet, Fibre Channel, FCoE and others). The parameters may be examined by a management application and/or device firmware. It is noteworthy that this block may be executed when a port is being configured or dynamically after a port has been in operation.

In block B508, the process determines if there is a user request for a long distance link. The term long distance may vary from one operating environment to another, but may include links that are over 500 meters long or more. If yes, then the long distance link request is evaluated in block B508.

If the request is not for a long distance link, then in block B510, the port negotiates a MTU size and any other link operating parameters. The parameters may be negotiated based on a protocol defined process, for example, "auto-negotiation" for ports configured to handle Ethernet traffic.

In block B512, based on the gathered data, receive queue sizes are configured by the network device firmware. The queue sizes may changes if the operating parameters, for example, MTU, link rate and others change over time.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine implemented method for a first network device communicating with a second network device, comprising:

determining a measured duration when a last data frame is received by the second network device from the first network device, after a pause frame is sent by the second network device to the first network device indicating to the first network device that it should pause sending data frames to the second network device;

comparing the measured duration with a stored maximum pause delay value and setting the measured duration as a new maximum pause delay value when the measured duration is greater than a current maximum pause delay value;

comparing the new maximum pause delay value with a programmed pause delay threshold value that indicates a duration after which the first network device will stop sending frames, after the pause frame is transmitted by the second network device; and adjusting a pause threshold value and the programmed pause delay threshold value, based on the comparison between the new maximum pause delay value with the programmed pause delay threshold value, wherein the pause threshold value is based on a portion of a memory device that can be used to store frames received from the second network device.

2. The method of claim 1, wherein a pause delay timer determines the measured duration.

3. The method of claim 1, wherein the stored maximum pause delay value is monitored and periodically updated to adjust the pause threshold value.

4. The method of claim 1, wherein the second network device includes a port with a receive buffer to store frames received from the first network device and the pause threshold value determines an amount of information that can be stored at the receive buffer.

5. The method of claim 1, wherein the first network device is an adapter and the second network device is a switch element.

6. The method of claim 1, wherein the first network device is a switch element and the second network device is an adapter.

7. The method of claim 1, wherein the second network device receives frames at a port that can be configured to operate at multiple speeds and process frames according to a plurality of protocols.

8. A system, comprising:

a first network device communicating with a second network device;

wherein the second network device is configured to determine a measured duration during which a last data frame is received by the second network device from the first network device, after a pause frame is sent by the second network device to the first network device indicating to the first network device that it should pause sending data frames to the second network device; compare the measured duration with a stored maximum pause delay value and setting the measured duration as a new maximum pause delay value when the measured duration is greater than a current maximum pause delay value; compare the new maximum pause delay value with a programmed pause delay threshold value that indicates a duration after which the first network device will stop sending frames, after the pause frame is transmitted by the second network device; and adjusting a pause threshold value and the programmed pause delay threshold value, based on the comparison between the new maximum pause delay value with the programmed pause delay threshold value; and wherein the pause threshold value is based on a portion of a memory device that can be used to store frames received from the second network device.

9. The system of claim 8, wherein a pause delay timer determines the measured duration.

10. The system of claim 8, wherein the stored maximum pause delay value is monitored and periodically updated to adjust the pause threshold value.

11. The system of claim 8, wherein the second network device includes a port with a receive buffer to store frames received from the first network device and the pause threshold value determines an amount of information that can be stored at the receive buffer.

12. The system of claim 8, wherein the first network device is an adapter and the second network device is a switch element.

13. The system of claim 8, wherein the first network device is a switch element and the second network device is an adapter.

14. The system of claim 8, wherein the second network device receives frames at a port that can be configured to operate at multiple speeds and process frames according to a plurality of protocols.

15. A machine implemented method for a first network device communicating with a second network device, comprising:

comparing a measured duration with a stored maximum pause delay value and setting the measured duration as a new maximum pause delay value when the measured duration is greater than a current maximum pause delay value, wherein the measured duration is a duration when a last data frame is received by the second network device from the first network device, after a pause frame is sent by the second network device to the first network device indicating to the first network device that it should pause sending data frames to the second network device comparing the new maximum pause delay value with a programmed pause delay threshold value that indicates a duration after which the first network device will stop sending frames, after the pause frame is transmitted by the second network device; and adjusting a pause threshold value and a programmed pause delay threshold value, based on a comparison between the new maximum pause delay value with the programmed pause delay threshold value; wherein the programmed pause delay threshold value indicates a duration after which the first network device will stop sending frames, after the pause frame is received by the first network device and wherein the pause threshold value is based on a portion of a memory device that can be used to store frames received from the second network device.

16. The method of claim 15, wherein a pause delay timer determines the measured duration.

17. The method of claim 15, wherein the stored maximum pause delay value is monitored and periodically updated to adjust the pause threshold value.

18. The method of claim 15, wherein the second network device includes a port with a receive buffer to store frames received from the first network device and the pause threshold value determines an amount of information that can be stored at the receive buffer.

19. The method of claim 15, wherein the first network device is an adapter and the second network device is a switch element.

20. The method of claim 15, wherein the first network device is a switch element and the second network device is an adapter.

21. The method of claim 15, wherein the second network device receives frames at a port that can be configured to operate at multiple speeds and process frames according to a plurality of protocols.

* * * * *